UNITED STATES PATENT OFFICE.

HENRY AZOR WENTWORTH, OF NEWTON, MASSACHUSETTS, ASSIGNOR TO HUFF ELECTROSTATIC SEPARATOR COMPANY, OF BOSTON, MASSACHUSETTS, A CORPORATION OF MAINE.

ROASTING SEPARATION PROCESS.

938,732.

Specification of Letters Patent.

Patented Nov. 2, 1909.

No Drawing. Application filed January 2, 1909. Serial No. 470,404.

*To all whom it may concern:*

Be it known that I, HENRY AZOR WENTWORTH, a citizen of the United States, and resident of Newton, in the county of Middlesex and State of Massachusetts, have invented new and useful Improvements in Roasting Separation Processes, of which the following is a specification.

My invention relates to the separation of the ingredients which constitute ore mixtures and particularly to the separation of sulfid ores from each other.

Various separative processes have been applied to the work of segregating sulfids from the gangue minerals such as quartz, limestone, garnet etc. with which they are found associated, and so far as the separation of the sulfids from the gangue is concerned, no very difficult, certainly no insuperable problem is presented to those skilled in the art of separation in its present day condition. When it comes, however, to the separation of one sulfid from another, the situation is different and processes which successfully segregate sulfids from gangue are in practice incapable of separating many sulfids from one another. There are large bodies of ore in Colorado, Montana, New Mexico and elsewhere from which the sulfids can be separated commercially as a whole from the gangue materials, but in which the separation of some of the sulfids from one another has not proved commercially practicable by known existing methods. In almost all ores of this character it is of particular importance that zinc sulfids (either blende or marmatite) be separated mechanically from sulfids of lead, iron, and copper, some or all of which are found accompanied by zinc sulfid.

By experimentation with many mineral substances I have found that there are pronounced differences in respect to the surface tension effect of a liquid upon various materials and that as a rule metallic oxids or sulfates are sustained not at all or are sustained comparatively feebly by liquid tension as contrasted with the crystalline sulfids of the same bases. These differentiating surface tension effects are manifested in various ways. Finely comminuted metallic sulfids if gently deposited upon the surface of water are readily sustained thereby, whereas oxids or sulfids become quite readily superficially wetted and sink beneath the surface. Also if oil is agitated in contact with metallic oxids or sulfates, it does not adhere to them so readily as it does to the sulfids of the same metals; if mixtures of minerals are treated as a wet pulp with a warm dilute solution of acid or acid salt, causing the formation of bubbles of gas, these bubbles selectively attach themselves to sulfid particles and do not become readily attached to particles of oxids or sulfates. Such phenomena as these appear to demonstrate that the sulfids have in general a much feebler superficial attraction for water or liquids in which water is an important ingredient than do oxids or sulfates, and that when immersed the oxids or sulfates are so intimately associated with contacting water molecules that the attachment of bubbles to these solids is resisted whereas even though immersed, sulfid particles lie in less intimate contact with water so that gas bubbles insinuate themselves, as it were, between the water and the sulfid particles, clinging to the latter and buoying it up. As to the difference in affinity for oily substances, the contrast between sulfids on the one hand, and oxids or sulfates on the other, may demonstrate that for oily liquids the sulfids possess a stronger superficial affinity than do the other salts.

Whatever may be the true explanation of the differences between the behavior of sulfids and oxids, sulfates or whatever may be formed of some of the sulfids by heat these phenomena have at least demonstrated that mixtures containing a sulfid and also oxids, sulfates or their compounds can be separated by flotation processes.

My process herein described consists in a preliminary treatment of ore mixtures containing several sulfids, which converts some of the sulfids superficially at least into metallic salts which are differentiated from the sulfids in their behavior with respect to superficial adhesion of a liquid, and thereafter subjecting the mixture thus prepared to a separative flotation which may be of one or another specific character. The preliminary treatment so affects some sulfids as to relegate them to the same class as that naturally occupied by the gangue materials in respect to the flotation separation to be next employed. As a specific illustration I take an ore which contains zinc sulfid, lead sulfid, copper sulfid, iron sulfid and rock or gangue. Such a mixture being first comminuted so as to physically free the several ingredients one from another, is then subjected to a roasting at such a temperature and for such time that the zinc sulfid particles are not appreciably affected, if they are affected at all, while the other sulfids are superficially at least, changed in chemical character, converted perhaps into oxids or sulfates, or both. Ordinarily to accomplish this result a roasting for but a few minutes at a temperature to give a dull red heat will be found sufficient.

After roasting, the mass of comminuted particles is cooled and then put into contact accompanied by agitation with an oil such as crude mineral oil, with possibly a small proportion of acid, such as sulfuric acid, whereupon the oil selectively attaches itself to the zinc sulfid particles leaving the particles of the altered ingredients substantially untouched. The mass of material is then passed through or upon a surface of water which floats the oil coated zinc sulfid particles while the other particles comprising metallic salts and gangue, sink; this operation permits the separation and collection of the floated sulfid on the one hand and those ingredients which have been precipitated on the other.

The oil flotation treatment is mentioned merely as a specific instance of one kind of flotation separation which may be employed to segregate those particles which have been affected by the preliminary heating or roasting from those which have passed through the preliminary stage without being sensibly affected. As the flotation separation depends principally upon the selective effects of liquid film tension or adhesion, other specific and well known flotation processes may be employed when appropriate, or may be adopted as a suitable alternative for a process involving the employment of oil.

The apparatus required for the performance of the above described process need not be described in detail for the reason that many forms of roasting ovens now in use are suited to the preliminary treatment of ores containing several metallic sulfids; also the agitating vessels now in use in oil flotation processes are adapted to the treatment of the ore mixtures differentially affected by the preliminary roasting; also the flotation tanks and collecting apparatus now in use may without appreciable change, be employed to effect the final separation.

What I claim and desire to secure by Letters Patent is:

1. The process of separating zinc sulfid from other sulfids associated therewith which consists in superficially changing sulfids other than zinc sulfids by subjecting the mass to heat, and thereafter separating by flotation, the heat-affected particles from those unaffected.

2. The process of separating zinc sulfid from iron sulfid, copper sulfid, and lead sulfid, which consists in subjecting the mixture to a roasting to an intensity sufficient to at least superficially oxidize the sulfids other than zinc sulfid, while insufficient materially to affect the zinc sulfid, and thereafter separating the zinc sulfid from the other ingredients by flotation.

Signed by me at Boston, Massachusetts this twenty-eighth day of December 1908.

HENRY AZOR WENTWORTH.

Witnesses:
CHARLES D. WOODBERRY,
JOSEPHINE H. RYAN.